United States Patent [19]

Tannenbaum et al.

[11] Patent Number: 5,442,376
[45] Date of Patent: Aug. 15, 1995

[54] HANDLING MULTIPLE COMMAND RECOGNITION INPUTS IN A MULTI-TASKING GRAPHICAL ENVIRONMENT

[75] Inventors: Alan R. Tannenbaum, Lighthouse Point, Fla.; John M. Zetts, Falls Church, Va.

[73] Assignee: International Business Machines Corporation, Armonk, N.Y.

[21] Appl. No.: 966,206

[22] Filed: Oct. 26, 1992

[51] Int. Cl.[6] .................................................. G09G 5/00
[52] U.S. Cl. ..................................... 345/156; 345/200
[58] Field of Search ............... 340/703, 706, 710, 711; 341/20, 22; 345/156, 157, 163, 168, 200

[56] References Cited

U.S. PATENT DOCUMENTS

| | | |
|---|---|---|
| 4,451,895 | 5/1984 | Sliwkowski . |
| 4,587,630 | 5/1986 | Straton et al. . |
| 4,686,332 | 8/1987 | Greanias et al. ............... 340/706 |
| 4,689,761 | 8/1987 | Yurchenco . |
| 4,726,065 | 2/1988 | Froessl . |
| 4,803,463 | 2/1989 | Sado . |
| 4,899,138 | 2/1990 | Araki et al. . |
| 4,903,012 | 2/1990 | Ohuchi . |
| 4,908,612 | 3/1990 | Bromley et al. . |
| 4,931,950 | 6/1990 | Isle et al. . |
| 4,972,496 | 11/1990 | Sklarew . |
| 5,007,085 | 4/1991 | Greanias et al. ............... 340/710 |
| 5,047,952 | 9/1991 | Kramer et al. ................. 341/20 |
| 5,157,384 | 10/1992 | Greanias et al. . |
| 5,218,671 | 6/1993 | Liao et al. ....................... 340/703 |

OTHER PUBLICATIONS

H. Ishii, et al., "Multimedia User Interface for Office Workstations," *Euromicro*, 1985, pp. 433–440.

*Primary Examiner*—Ulysses Weldon
*Assistant Examiner*—Gin Goon
*Attorney, Agent, or Firm*—George E. Grosser; John E. Hoel

[57] ABSTRACT

A method and system to recognize input events from a plurality of input devices. Each input device is coupled to a device driver or similar device specific code and a recognition provider. Upon attachment to the system, the recognition provider registers the known input events which the input device is capable of transmitting at the recognition subsystem. The recognition subsystem sends an identifier back to the recognition provider for each registered input event. When the recognition provider receives one or more input signals from the input device which are recognized as an input event, the provider sends the identifier to the recognition subsystem. The input event is transmitted to a process running on the system which may interpret the input event or request translation by the recognition subsystem. The invention is useful to introduce new input devices to a system without requiring modification of the existing processes.

33 Claims, 8 Drawing Sheets

| FIG. 2A |
|---------|
| FIG. 2B |

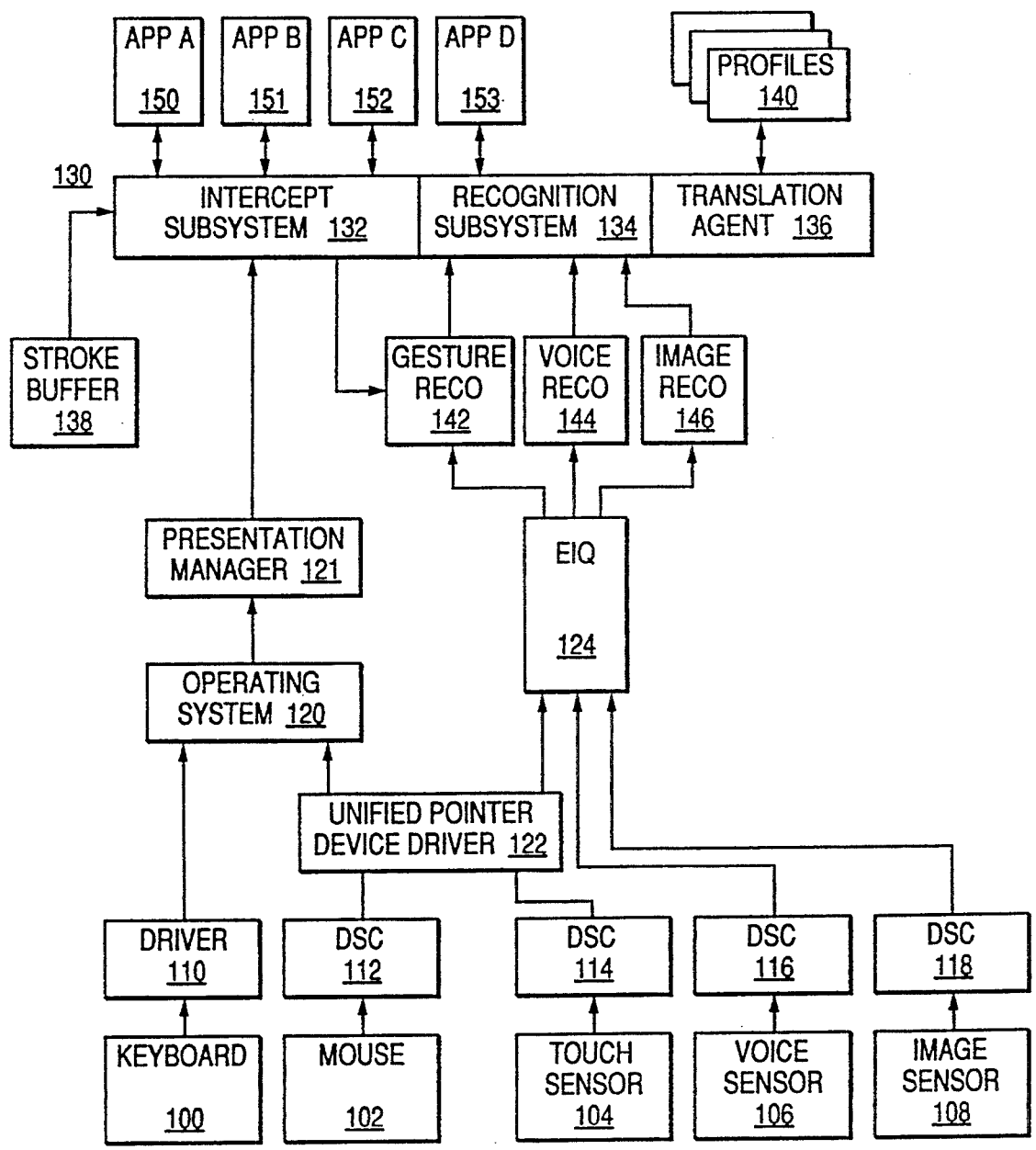

FIG. 6

GESTURE RECOGNITION PROVIDER

| RECOGNITION EVENT | ID NUMBER | OPTIONAL INFO (FEEDBACK) |
|---|---|---|
| G CIRCLE | R1 | BEEP AND FLASH CIRCLE DIAGRAM |
| G UP ARROW | R2 | BEEP AND FLASH UP ARROW DIAGRAM |
| G DOWN ARROW | R3 | BEEP AND FLASH DOWN ARROW DIAGRAM |
| G SIGMA | R4 | BEEP AND FLASH SIGMA DIAGRAM |
| G M | R5 | BEEP AND FLASH LETTER M DIAGRAM |

VOICE RECOGNITION PROVIDER

| RECO EVENT | ID NO. | OPTIONAL INFO |
|---|---|---|
| V SEND | R6 | TYPE "SEND" OVER VOICE ICON |
| V DIAL | R7 | TYPE "DIAL" OVER VOICE ICON |
| V COMMENT | R8 | TYPE "COMMENT" OVER VOICE ICON |
| V BIG | R9 | TYPE "BIG" OVER VOICE ICON |
| V SMALL | R10 | TYPE "SMALL" OVER VOICE ICON |

FIG. 7

OFFICE APPLICATION PROFILE

| ID NO. | CORRESPONDING COMMAND | COMMENT |
|---|---|---|
| R1 | POPKEY | INVOKES POP-UP KEYBOARD |
| R2 | INSERT | INSERTS KEYBOARD INPUT AT TIP OF ARROW |
| R3 | SCROLL | SCROLL DOWN |
| R4 | CUT AND PASTE | CUT AND PASTE |
| R5 | MOVE | MOVE SELECTED OBJECTS TO M CHARACTER |
| R6 | SEND TO TARGET OBJECT | SEND |
| R7 | DIAL PHONE NUMBER | DIAL |
| R8 | ADD BUCKSLIP | BUCKSLIP |
| R9 | MAXIMIZE TARGET WINDOW | MAXIMIZE WINDOW |
| R10 | MINIMIZE TARGET WINDOW | MINIMIZE WINDOW |

HANDLING MULTIPLE COMMAND RECOGNITION INPUTS IN A MULTI-TASKING GRAPHICAL ENVIRONMENT

FIELD OF THE INVENTION

This invention relates generally to input devices for a data processing system. More particularly, it relates to a method and system for recognizing inputs from a plurality of input devices and to allow for a consistent interface for such devices.

BACKGROUND OF THE INVENTION

As computer technology has progressed and particularly with the advent of the personal computer, data processing has reached every level of society and every level of user. A large body of software has been written for the IBM TM compatible Personal Computers. The vast majority of these applications are written to accept keyboard input only or the combination of keyboard and mouse pointing device input. Furthermore, the operating systems which control the personal computers and allow data to pass to the applications also are primarily written for the, combination of keyboard and mouse input only.

Many new input devices such as touch sensors, pen-date displays, voice recognition devices, data gloves and bar code scanners are more appropriate for certain operations and provide a very efficient way of controlling their specifying input to a computer system. Unfortunately, the large body of applications do not understand this type of input.

Commonly assigned U.S. patent application Ser. No. 5,157,384, entitled "Advanced User Interface", filed Apr. 28, 1989 and hereby incorporated by reference, teaches an operating system enhancement which allows existing application programs to understand new input devices. Certain improvements to that operating system extension are described in copending application Ser. No. 07/779,702, entitled "Graphical User Interface With Gesture Recognition In A Multi Application Environment" filed Oct. 21, 1991 which is a continuation in part of Ser. No. 07/344,879 (U.S. Pat. No. 5,157,384) and is also hereby incorporated by reference.

In the future, a plurality of input devices will be operating concurrently on a given system. It is also desired to accommodate the development of new recognition devices which are not presently available. Thus, there is a scenario where many input devices with a plurality of different input events which developers of the operating system or applications running thereon have no present knowledge. Rather continuing to rewrite the operating system or the operating system extension, the Applicants believe it would be preferred to develop a device independent interface. The interface should allow the attachment of new input devices in the delivery of their new input events to existing application programs without revision to the application, program, to the operating system or to the operating system enhancement.

SUMMARY OF THE INVENTION

It is therefore an object of the present invention to allow concurrent use of multiple input devices.

It is an object of the present invention to accommodate the use of new input devices with the existing program without change to application programs or operating system.

It is an object of the present invention to provide a consistent interface to programs and input devices to handle new input devices and new input events.

It is an object of the present invention to register a new input device attaching to the program interface and its repertoire of input events.

These and other objects and features of the invention are accomplished by a method and system for registering input events by the introduction of a recognition subsystem. A plurality of input devices are coupled to the system by means of device adapters and device drivers. Each input device is capable of generating plurality of input events. In a preferred embodiment of the invention, the plurality of device drivers are modified to become recognition providers. In an alternative embodiment, a separate layer of recognition providers are added between the device drivers and the operating system and its extensions.

An input event is a predetermined input signal or set of input signals which is recognized by a recognition provider associated with that input device as an input event. For example, a touch sensor may recognize gestures as input. The touch down of a stylus on to the touch sensor, a set of input signals representing a path of the stylus on the touch sensor and the stylus liftoff from the touch sensor, generate a set of input signals which are known to the recognition provider of the touch sensor as a circle gesture input event. Upon attachment of the input device and its associated recognition provider, the provider registers with the recognition subsystem a list of all the events which may be generated by the input device. For each event in the list, the provider supplies required information such as an identifying character string and optional information for a target object or for graphical or audible feedback to the user when the event is invoked. For each event in the list of input events the recognition subsystem assigns an identification string and informs the recognition provider of the identification string.

Once the registration procedure is complete, normal processing continues and the recognition subsystem remains idle until another provider attempts to register or a previously registered recognition provider has an input event to report. In the first case, processing proceeds with registration as described above; no limit is placed on the number of different recognition providers which can be concurrently registered with the recognition subsystem. Of course, there may be restraints placed by the operating system for allocation of memory, etc. When a previously registered recognition provider reports an event, a user of the computer system has employed an input device to direct a command to the system. The recognition provider receives the input signals from the user and associates those input signals with the input event. That input event is associated with the identification number provided to it by the recognition subsystem during the registration procedure above. The recognition provider can also associate the input event with a particular system object displayed in a window. Having received the input event, the recognition subsystem notifies the target object that an input event has occurred. In addition to the input type and identifier of the input event, the recognition subsystem may make available information to the target object which is used to determine the state of the system at the time the input event was generated. Such state information includes the active object or its window, the object or its window to which keyboard events would have been delivered and information about the raw input signals generated by the input device. The target object may choose to interpret the event or request that the recognition subsystem provide a translation of the input event.

BRIEF DESCRIPTION OF THE DRAWINGS

These and other objects and features will be more easily understood by reference to the attached drawings and following descriptions.

FIG. 3 is a block diagram of a plurality of application programs running in a data processing system equipped with the operating system enhancement according to the present invention.

FIG. 6 is a table of recognition events.

FIG. 7 is an interface profile.

DETAILED DESCRIPTION OF THE DRAWINGS

Figure 1:
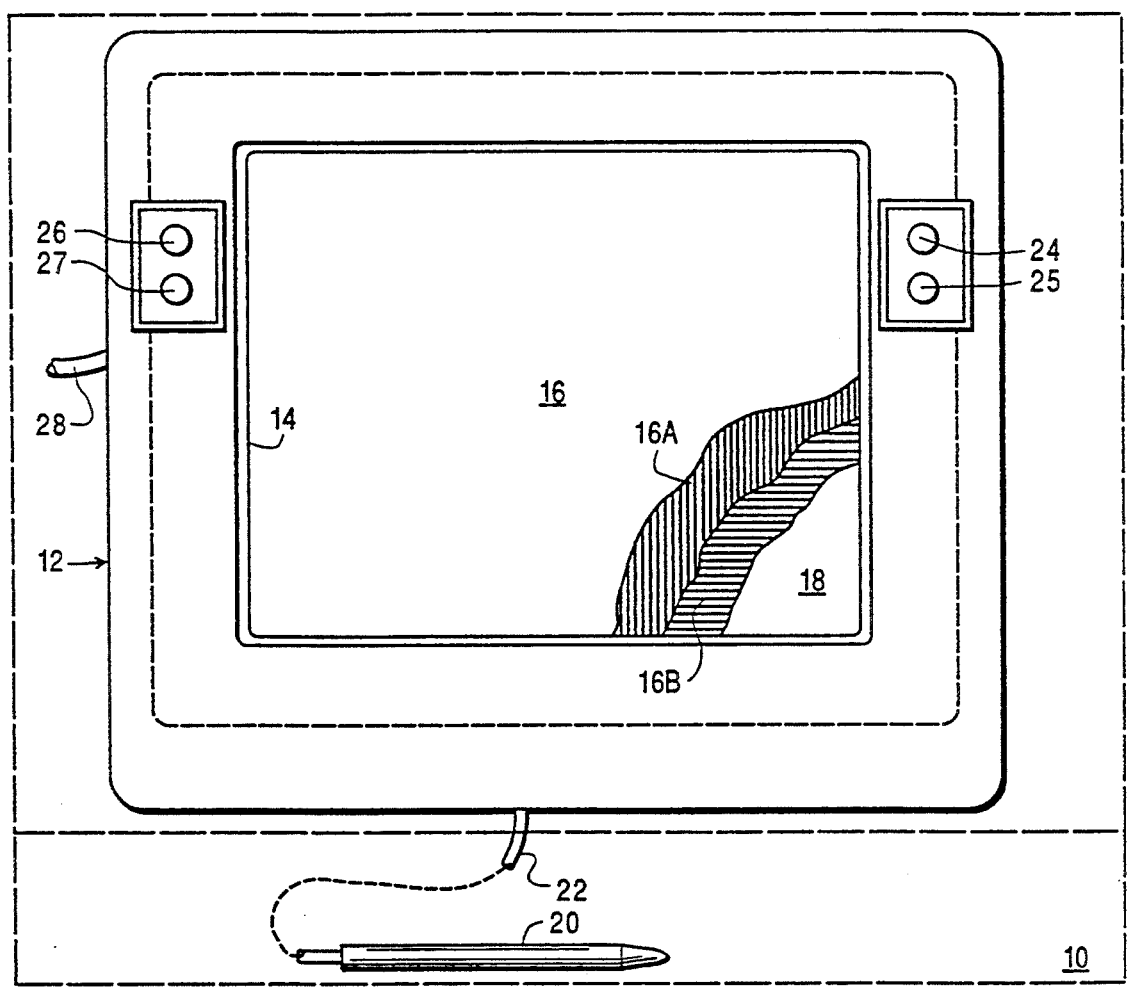
FIG. 1 is a front view of an overlay unit used for detection of finger touch and stylus position.

The environment in which a preferred embodiment of the invention is implemented is described with reference to FIGS. 1 and 2. Referring to FIG. 1, a touch workpad, substantially similar to that described in co-pending application Ser. No. 351,227 to Arbeitman, et al., entitled "Flat Touch Screen Workpad For A Data Processing System" filed May 15, 1989, which is hereby incorporated by reference, is shown. The workpad comprises a housing 12 having a rectangular recessed window 14 which surrounds the edges of a rectangular touch overlay 16. The touch overlay 16 is transparent and is disposed on a liquid crystal display (LCD) 18. The overlay 16 consists of a laminate structure including several plastic substrate layers laminated together by means of adhesive layers. The overlay 16 also includes a first plurality of transparent conductors 16A disposed in the vertical direction and a second plurality of transparent conductors 16B disposed in the horizontal direction. Several of the conductors in both vertical and horizontal directions are positioned beyond the recessed window 14 to allow more accurate location determination of the stylus 20 or a finger on or near the overlay 16 at the edges of the display window 14.

A stylus 20 is connected to cable 22 to the touch workpad. The stylus 20 acts as an antenna to pick up the signals radiated by the overlay 16, and provides much greater resolution that can be provided by a finger touch. Also on the bezel of the housing are four button switches 24–27 which can be used to change the mode in which the data from the workpad 10 is received. Workpad cable 28 is the connector between the workpad and the computer with which the user is communicating. The workpad cable 28 provides power to the workpad 10 as well as display signals to operate the LCD 18 and touch signals to operate the overlay in both finger touch and stylus modes. In addition, the cable 28 is also the conduit to the computer of the computer of the measurement of the signal strength received by the stylus 20 and the frequency change due to changes in capacitance due to a finger touch.

Figures 2, 2A:
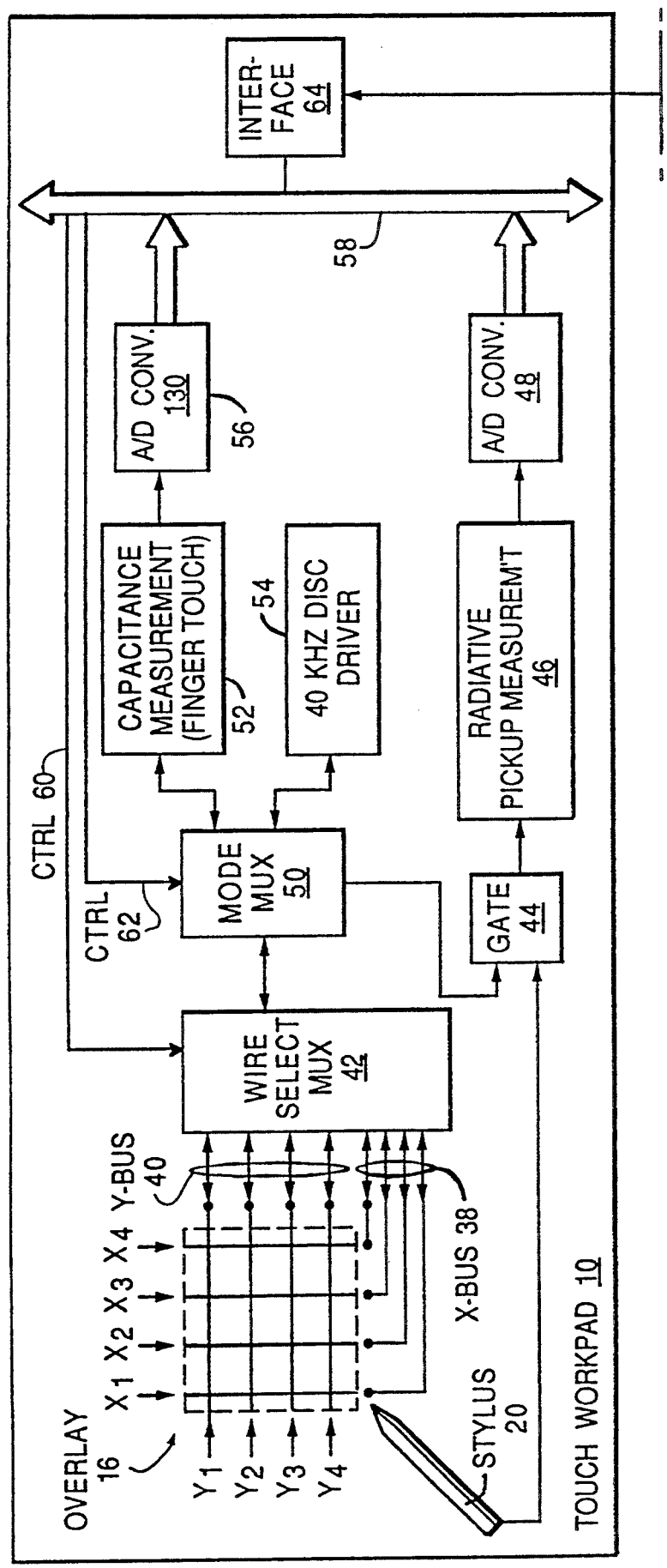
FIGS. 2, 2A and 2B are architectural diagram of a combined finger touch and stylus detection system.
Figure 2B:
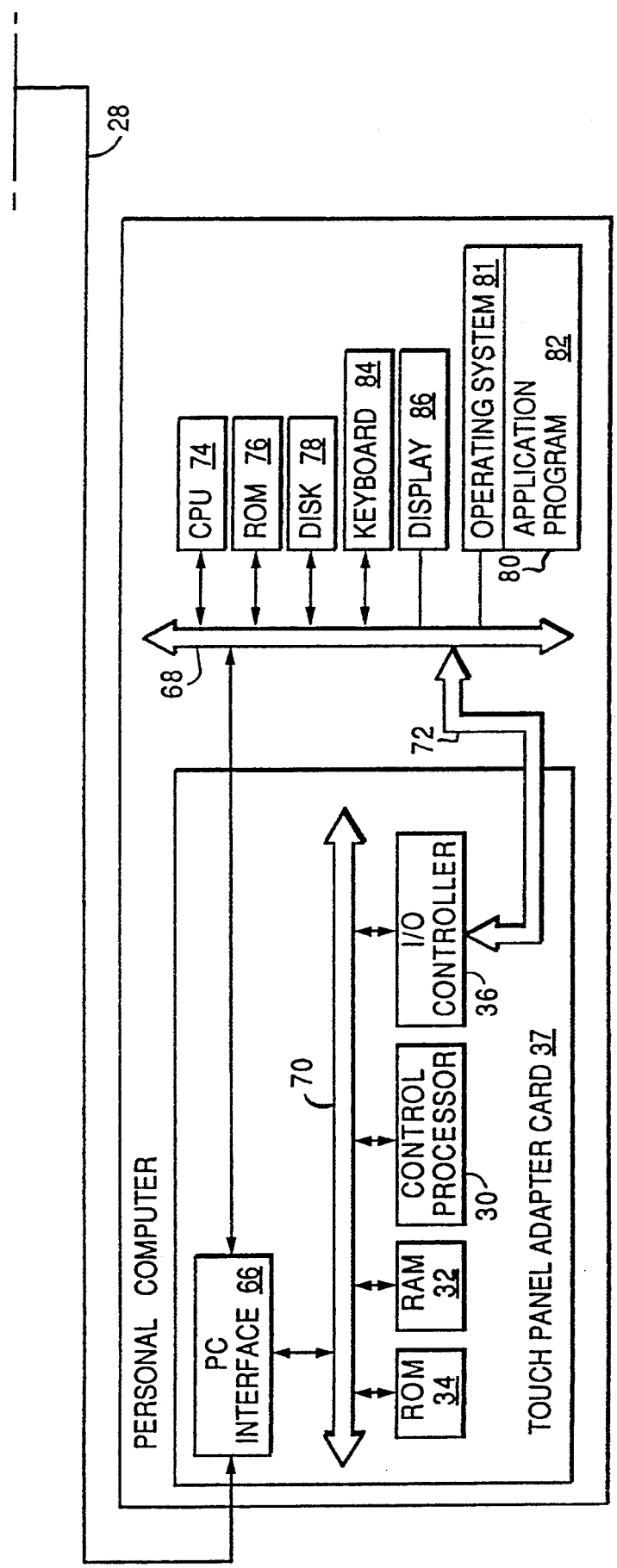

FIG. 2 shows an architectural diagram of the finger touch and stylus detection system. The system depicted in FIG. 2 is similar to that disclosed in the U.S. Pat. No. 4,686,332, which is hereby incorporated by reference, in FIG. 9. The touch control processor 30, random access memory 32, read only memory and the I/O controller 36 are on a touch panel adapter card 37 in a personal computer while the rest of the touch electronics are integrated in the touch workpad 10. As discussed in connection with FIG. 1, the touch workpad 10 communicates with the personal computer and touch panel adapter card 37 via cable 28. The vertical X conductors are connected through the X bus 38 and the horizontal Y conductors are connected through the Y bus 40 to the wire selection multiplexer 42, respectively. The radiative pickup stylus 20 is connected through the gate 44 to the radiative pickup measurement device 46. The wire selection multiplexer 42 is connected through the mode multiplexer 50 to the capacitance measurement device 52 which is used for capacitance finger touch detection. The wire selection multiplexer 42 is also connected through the mode multiplexer 50 to the 40 KHz oscillator driver 54 which is used to drive the X bus 38 and the Y bus 40 for the stylus detection operation. The mode multiplexer 50 also has an enabling output to the gate 44 to selectively connect the output of the stylus 20 to the radiative pickup measurement device 46, for stylus detection operations. The output of the capacitance measurement device 52 is connected through the analog-to-digital converter 56 to the workpad bus 58. The output of the radiative pickup measurement device 46 is connected through the analog-to-digital convertor 48 to the bus 58. A control input 60 to the wire selection multiplexer 42 is connected to the bus 58. The control input 62 is connected to the mode multiplexer 50 from the bus 58.

The workpad bus 58 is connected via workpad interface 64 to the cable 28 which connects to PC interface 66 in the touch panel adapter card 37 in the personal computer. The PC interface 66 communicates to the main system bus 68 and to the adapter card bus 70. The I/O controller 36 has an I/O bus 72 which connects to the main bus 68 of the Personal Computer. The I/O controller 36 is also connected to adapter card bus 70. The adapter bus 70 also interconnects the control processor 30 with the read only memory (ROM) 34, and the random access memory (RAM) 32. The personal computer includes standard devices such as CPU 74, ROM 76, disk storage 78, a memory 80 which stores operating system 81 and application programs 82, a standard keyboard 84 and standard display 86. The standard display 86 is typically a CRT, and in the preferred embodiment is in addition to the LCD 18 in the workpad 10.

The wire selection multiplexer 42 and the mode multiplexer 50 connect selected patterns of a plurality of the horizontal and vertical conductors in the overlay 16 to either the capacitance measurement device 52 or the 40 KHz oscillator driver 54, in response to control signals applied over the control inputs 60 and 62 from the bus 58 by the control processor 30. During finger touch operations, the capacitance measuring device 52 has its input operations, the capacitance measuring device 52 has its input coupled through the mode multiplexer 50 and the wire selection multiplexer 42 to selected single conductors in the horizontal and vertical conductor array in the overlay 16 in response to control signals from the control processor 30. The output of the capacitance measurement device 52 is converted to digital values by the A/D converter 56 and is supplied over the bus 58 to the control processor 30. The control processor 30 executes a sequence of stored program instructions to detect the horizontal array conductor pair and the vertical array conductor pair in the overlay 16 which are being touched by the operator's finger.

The finger touch and stylus sensing modes operate independently of one another, the detection system cycling between the two modes until a finger touch or stylus is detected.

Copending U.S. Pat. No. 5,157,384, entitled "Advanced User Interface" or AUI, describes an operating system extension which allows new forms of input to be handled by applications which were not written to understand that type of input. Certain improvements to that operating system extension are described in copending application Ser. No. 07/779,702, entitled "Graphical User Interface With Gesture Recognition In A Multiapplication Environment" filed Oct. 21, 1991. For example, most applications to date are written accept only keyboard an mouse input. A user could use the Advanced User Interface (AUI) to utilize a touch sensor without modifying any of an application's code which was originally written to accept only mouse and keyboard input. In one preferred embodiment, the AUI is stored in RAM 80 with the operating system 81 and the application programs 82.

FIG. 3 depicts a plurality of input devices 100 through 108 communicating to the system through their device drivers or device specific code modules 110 through 118. Other than the input devices themselves, all elements depicted in FIG. 3 are preferably "codemodules" resident in the main memory. As some of the code modules directly attached to the input devices do not carry all of the functions one normally associates with a device driver, they are called device specified code. A plurality of applications 150 through 153 are running concurrently by means of the operating system 120 and the operating system enhancement as taught by copending U.S. Pat. Nos. 4,868,332, 5,007,085 and 5,157,384, which are incorporated herein by reference. The keyboard 100 is handled by keyboard device driver 110. Mouse pointing device 100 and touch sensor 104, which is also a pointing device are handled by their respective device specific code modules 112 and 114 to the unified pointer device driver 122. Voice sensor 106 and image sensor 108 are handled by device specific code modules 116 and 118 respectively. Two channels for input are shown in FIG. 3. Keyboard and pointing device input go through the normal channel through the operating system 120 and its presentation manager 121 through the input queue. As taught in commonly assigned copending application, entitled "Method For Buffering High Band Data From An Input Device" Ser. No. 07/779,703, filed Oct. 21, 1991, which is incorporated herein by reference, a second channel through the extended information queue 124 is provided which allows much more information to be communicated to the application programs 150 through 153. As taught by the 07/779,703 application, through the use of false pointing device events generated by the unified pointer device driver, the environmental link module 130 of the advance user interface can consult the EIQ 124 for detailed information which can not be passed to the operating system 120. For example, in the case of touch event on the touch sensor 104, the unified pointer device driver automatically generates a false mouse pointer event 122 with the same time stamp as the touch input event. The false mouse event is sent to the operating system 120 and the much larger bandwidth EIQ 124 receives all the touch input.

The intercept subsystem 132 of the environmental link module 130 intercepts the input messages which would normally go directly to the active application to determine whether an input device other than the keyboard or mouse were used. If this is true, the EIQ 124 passes this information to one of the providers 142, 144, 146 to identify the input event which occurred. After the recognition provider has identified the event, it refers to the table generated upon registration to get the recognition subsystem ID number and sends that ID number to the recognition subsystem 134. The recognition subsystem 134 can allow the applications to process the event or can ask the translation agent 136 to lookup the event in the interface profiles 140 for a corresponding command which the applications will understand.

The interface profiles 140 are described more completely in the U.S. Pat. No. 5,157,384 assigned to the International Business Machines Corporation and incorporated herein by reference. They contain input events matched to corresponding commands which the applications have been written to understand. Each profile is arranged for a particular application or user. Optical information such as an alphanumeric explanation of the input event and corresponding commands is also included in the profiles 140 for presentation in a control panel so that a user may also customize the profiles 140.

The present invention provides the interaction between the providers 142, 144, 146 and the recognition subsystem 134 of the environmental link program 130. The recognition subsystem 134 being part of the extension of the operating system provides attachment interfaces to providers of input events. Attachment consists of the registration of the recognition input event provider, hereinafter the provider. The provider will generally register by name. For example, gesture for the gesture recognition provider 142 or "voice" for the voice recognition provider 144. Once registered, the provider further registers with the recognition subsystem 134 a list of all the input events which may be generated by its input device. For the gesture recognition provider 142, the associated input device is the touch sensor 104. The voice recognition provider's 144 associated input device is the voice sensor 106. For each event in the list, the provider supplies required information such as a character string comprising the event and optional information such as target object or for a graphical or audible feedback to the user when the input event is successfully invoked. For each event in the list of recognition events, the recognition subsystem 134 assigns an identification number and informs the provider of the identification number.

Once the registration procedure is complete for that provider, normal processing continues. The recognition subsystem 134 remains idle until another provider attempts to register or a previously registered provider has an event to report.

In the first case, processing proceeds at the registration in the same manner that is described above. No limit is placed on the number of different recognition providers that can be concurrently registered with the recognition subsystem other than those restraints placed by the operating system, e.g., number of device handlers, number of active programs, allocation of memory, etc.

When a previously registered provider has an input event to report, it is usually the result of a user of the system manipulating in an input device to direct a command to the system. The provider receives a set of input signals from the input device and then associates those signals with a particular input event. That input event is then associated with the identification number provided to it by the recognition subsystem during the registration procedure. The provider can also associate a recognition event with a particular system object. The target object determination may be based on any information the provider wishes to use, such as the location of a gesture, the hot point in a gesture, or the spoken name of an object at the prefix of the command.

Figure 4:
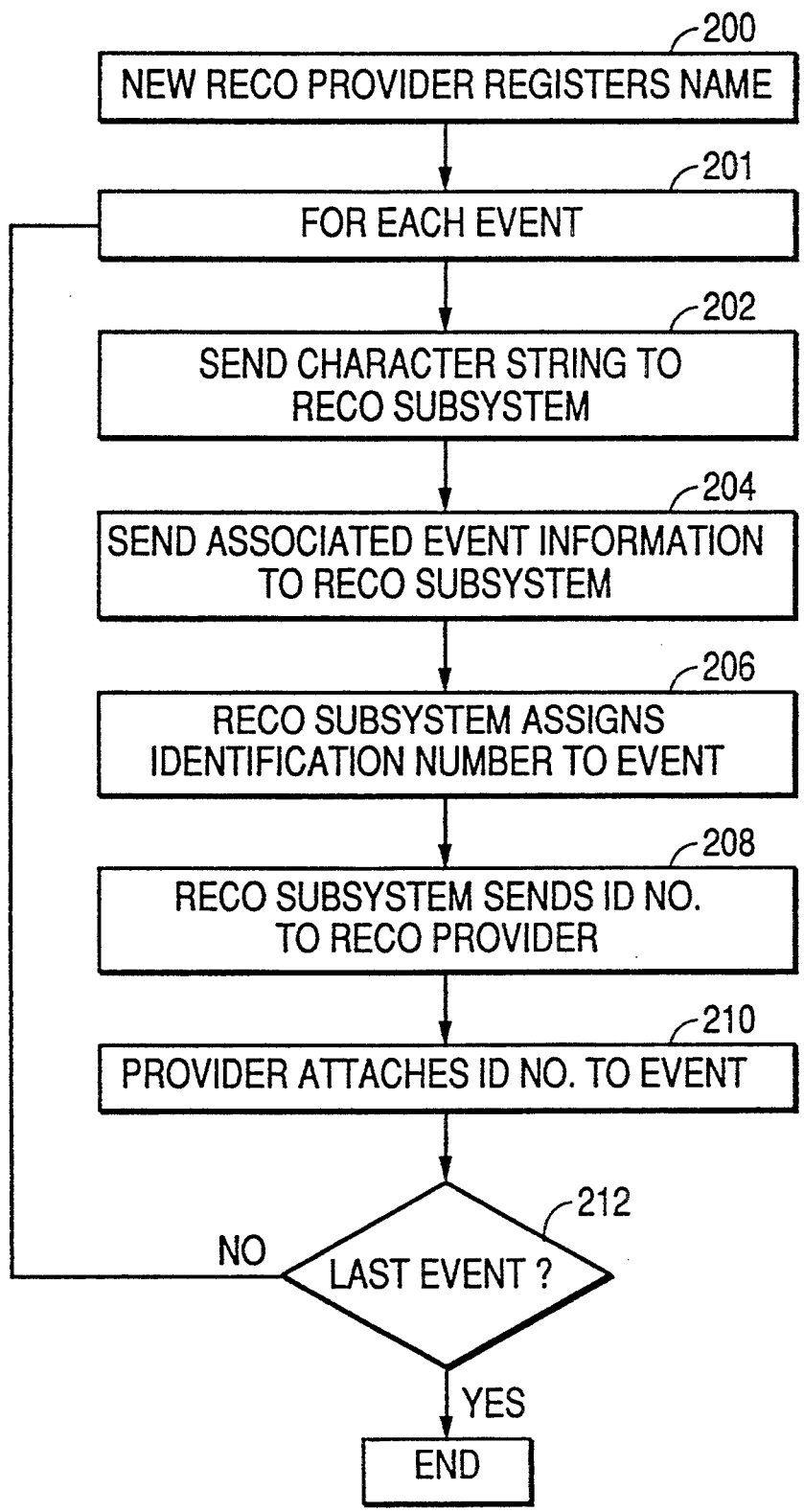
FIG. 4 is a flow diagram of the registration procedure of the present invention.

Registration of a new recognition provider is depicted in the flow diagram of FIG. 4. The process begins when the recognition provider registers its name in step 200. The recognition subsystem receives an event in step 201 and for each event a character string is sent to the recognition subsystem 202. If there is any associated event information, this is also sent to the recognition subsystem in step 204. Visual representation of an event, such a as an icon, will be displayed when the event is subsequently recognized. The recognition subsystem assigns an identification number to this event in step 206 and sends this identification number to the provider in step 208. The recognition provider attaches the ID number to the event, and assembles a table of input events in step 210. Next, in step 212, a test is performed by the recognition provider to determine Whether this is the last input event to be registered for the particular recognition provider. If it is, the process ends. If not, the process returns to step 201 for additional events.

Figure 5:
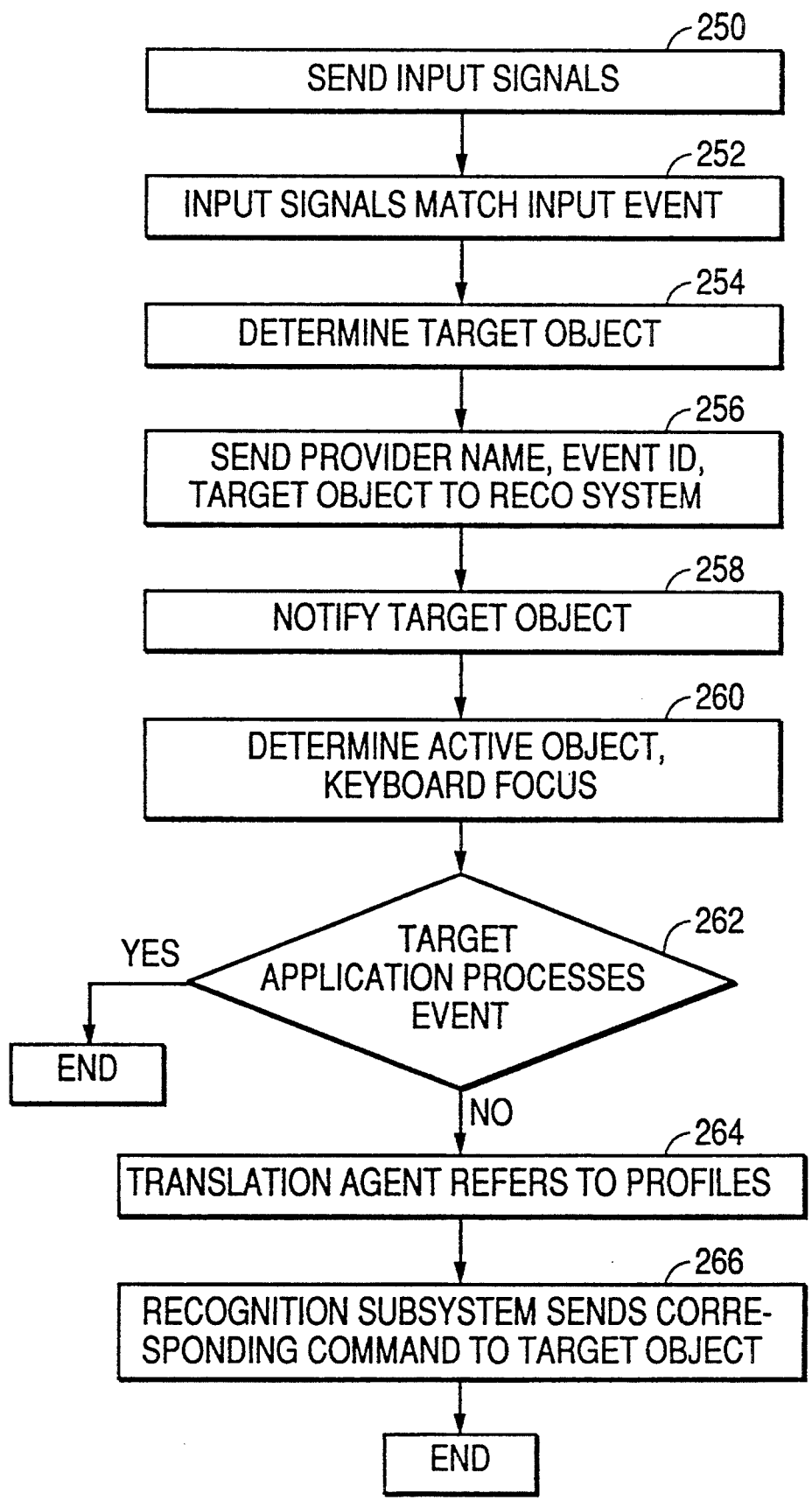
FIG. 5 is a flow diagram of the processing of a previously registered input event.

The processing of an input event is depicted in the flow diagram of FIG. 5. In step 250, the user has manipulated one of the input devices attached to the computer system. This results in input signals being passed through the device specific code to the recognition provider. The recognition provider attempts to match the received input signals to patterns of input signals which define in input event in step 252. If no input event is found that matches the input signals, the process ends. If an input event is identified the provider will attempt to identify the target object or application of the input signal in step 254. In the case of a gesture, one of the input points that make up the gesture is identified as a hot spot. The object which owns the window in which that hot spot occurs is identified as the target object. In the case of a voice input signal, the user will generally use the target application as a prefix. For example, a voice message to go to an office application may begin with the word "office". Once the target object is determined, the provider name, event ID number assigned to the event during registration and the target object are sent to the recognition subsystem in step 256. After receiving this event, the recognition subsystem notifies the target object that an input event has occurred in step 258. In addition to the type of event, e.g., gesture, and the identifier of the particular input event, the recognition subsystem can make available addition information in which the target object may be interested in step 260. Generally, this information is related to the state of the computer system at the time the input event was generated, including but not limited to the active object or window, the object to which the keyboard events would be delivered and information about the raw event. The target object may choose to interpret the event informing the recognition subsystem so that it can discontinue further processing of the event step 262.

If the target object does not wish to interpret the event, the recognition subsystem communicates with the translation agent module in the environment link. The translation agent refers to the interface profile based on the state of the system when the input event was generated, or by the target object identified by the provider in step 264. For example, the profile for the active application may be consulted. In the case of a gesture input event, the profile for the window in which the hot spot occurred is consulted. For the voice event, the target object designated by the prefix of the voice command would be consulted. If a profile has not been written for the particular object, a default profile is consulted. The profiles link the registration ID numbers of the input event to a corresponding command which will be understood by the target object or by another object which the user anticipates being in the system. Once the translation agent has located the appropriate profile and found the corresponding command, the recognition subsystem invokes the corresponding command. The profile map reco event names the command.

The profiles are established either by the user by interaction with a AUI control panel as disclosed in the '384 patent. Alternately, they may be shipped with the application. The profile writer is the end-user and the application profile always overrides the system profile.

Feedback from the target object or translation agent tells the recognition subsystem that the input event is successfully recognized by the target object. The information passed with the identifier to the recognition subsystem by the provider may also contain graphical or audio data. The graphical or audio data is used in the graphical user interface to inform the user of the successful recognition. For example, if a circle gesture was drawn on the touch sensor, a picture of a circle is presented to the user. Aspects of how the picture is displayed, length of time on the display, color or the circle, and so forth, may be included. Similarly, the audible component of feedback, such as duration and frequency of tone is included in the audio data.

The system allows the provider to add a new input event. The registration process can be extended at anytime.

FIG. 6 shows two tables of recognition events and the ID numbers which the recognition subsystem associates with the recognition events. Also shown is additional optional information which the recognition subsystem can use to indicate to the user that the input was successfully understood by the system. For the Gesture Recognition Provider, five gesture recognition gesture input events are tabulated: a circle, an up arrow, a down arrow, a sigma sign and a gesture resembling the letter M. Each recognition event is represented by an identifying character string such as G circle for the circle gesture and assigned a registration number R1 in the case of the circle gesture by the recognition subsystem. When the gesture is successfully recognized the system will beep and flash a picture of the gesture input to the system. The table for the voice recognition provider is similar, having five recognition events: send, dial, comment, big and small, beginning with the letter V to indicate that it is from the voice recognition provider and assigned a ID number during the registration process. When the voice input is successfully recognized, the ascii text corresponding to the utterance is typed over a voice icon in the graphical user interface.

FIG. 7 shows an example of an application profile for hypotheticed office application. Each ID number, R1 through R10, is matched to a corresponding command. For example, the circle gesture which is assigned ID number R1 results in the corresponding command "popkey" which invokes a pop-up keyboard, a utility in the advanced user interface. This is an example of a corresponding command going to an object other than the object to which the profile belongs. ID's are used internally, so they do not need to use character strings.

While the invention has been described with respect to particular embodiments it would be understood by those skilled in the art that modifications may be made without departing from the spirit and scope of the present invention. These embodiments are for purposes of example and illustration only and are not to be taken to limit the scope of the invention narrow in the scope of the impending claims.

We claim:

1. A method for registering a first input device to a system, the system having a memory, a processor and a display coupled to a system bus, the method comprising the steps of:
   allocating a first or normal channel in the memory for a presentation manager and a second channel in the memory for a recognition subsystem, each channel being a separate and independent program path in the memory;
   transmitting a first set of input events for the first input device to the recognition subsystem in the memory;
   assigning a corresponding identifier to each of the input events with the recognition subsystem; and,
   storing the first set of input events and the corresponding identifiers at the recognition subsystem and at a first recognition provider coupled to the recognition subsystem and to the first input device;
   transmitting a first input signal from the first input device through the second channel including an extended information queue to the first recognition provider, bypassing the presentation manager;
   recognizing the first input signal as a first input event with the first recognition provider; and,
   transmitting the corresponding identifier of the first input event from the first recognition provider to the recognition subsystem.

2. The method as recited in claim 1 which further comprises the steps of:
   comparing the corresponding identifier of the first input event to the identifiers corresponding to the first set of input events; and,
   transmitting the first input event directly to a first application in memory from the recognition subsystem.

3. The method as recited in claim 2 which further comprises the steps of:
   sending the first input event to a translation agent in memory which translates the first input event to a first message understood by a first process running in memory; and,
   transmitting the first message to the first application.

4. The method as recited in claim 2 which further comprises the steps of:
   determining a system state when the first input signal was transmitted;
   transmitting the first input event to the first application according to the system state.

5. The method as recited in claim 2 which further comprises the steps of:
   determining a system state when the first input signal was transmitted; and,
   transmitting the system state to the first application with the first input event.

6. The method as recited in claim 1 which further comprises the steps of:
   generating a false input signal corresponding to the first input signal;
   transmitting the false input signal to an operating system for transmission to a first application and transmitting the first input signal to an extended information queue;
   intercepting a false input signal before receipt by the first application; and,
   retrieving the first input signal from the extended information queue.

7. The method as recited in claim 1 which further comprises the steps of:
   transmitting an indicia that the first input event is to be sent to a first application with the identifier which corresponds to the first input event; and,
   transmitting the first input event to the first application according to the indicia.

8. The method as recited in claim 1 which further comprises the steps of:
   transmitting a second set of input events for a second input device to the recognition subsystem in the memory;
   assigning a corresponding identifier to each of the input events in the second set with the recognition subsystem; and,
   storing the second set of input events and the corresponding identifiers at the recognition subsystem and at a second recognition provider coupled to the second input device.

9. The method as recited in claim 8 which further comprises the steps of:
   transmitting a first input signal from the first input device; and a second input signal from the second input device;
   recognizing the first input signal as a first input event with the first recognition provider and the second input signal as a second input event with the second recognition provider; and,
   transmitting the corresponding identifiers of the first and second input events to the recognition subsystem.

10. The method as recited in claim 9 which further comprises the steps of:
    comparing the corresponding identifiers of the first and second input events to the identifiers corresponding to the first and second sets of input events respectively; and,
    transmitting the first and second input events to a first application in memory from the recognition subsystem.

11. The method as recited in claim 9 which further comprises the steps of:
    comparing the corresponding identifiers of the first and second input events to the identifiers corresponding to the first and second sets of input events respectively; and,
    transmitting the first input event to a first application in memory and the second input event to a second application in memory from the recognition subsystem.

12. A system for registering a first input device, the system having a memory, a processor and a display coupled to a system bus, the system comprising:
a first or normal channel in the memory for a presentation manager and a second or channel in the memory for a recognition subsystem, each channel being a separate and independent program path in the memory;
means for transmitting a first set of input events for the first input device to the recognition subsystem in the memory;
means for assigning a corresponding identifier to each of the input events with the recognition subsystem; and,
means for storing the first set of input events and the corresponding identifiers at the recognition subsystem and at a first recognition provider coupled to the recognition subsystem and to the first input device;
means for transmitting a first input signal from the first input device through the second channel to the first recognition provider, bypassing the presentation manager;
means for recognizing the first input signal as a first input event with the first recognition provider; and,
means for transmitting the corresponding identifier of the first input event from the first recognition provider to the recognition subsystem.

13. The system as recited in claim 12 which further comprises:
means for comparing the corresponding identifier of the first input event to the identifiers corresponding to the first set of input events; and,
means for transmitting the first input event directly to a first application in memory from the recognition subsystem.

14. The system as recited in claim 13 which further comprises:
means for sending the first input event to a translation agent in memory which translates the first input event to a first message understood by a first process running in memory; and,
means for transmitting the first message to the first application.

15. The system as recited in claim 13 which further comprises:
means for determining a system state when the first input signal was transmitted;
means for transmitting the first input event to the first application according to the system state.

16. The system as recited in claim 13 which further comprises:
means for determining a system state when the first input signal was transmitted; and,
means for transmitting the system state to the first application with the first input event.

17. The system as recited in claim 12 which further comprises:
means for generating a false input signal corresponding to the first input signal;
means for transmitting the false input signal to an operating system for transmission to a first application and transmitting the first input signal to an extended information queue;
means for intercepting a false input signal before receipt by the first application; and,
means for retrieving the first input signal from the extended information queue.

18. The system as recited in claim 12 which further comprises:
means for transmitting an indicia that the first input event is to be sent to a first application with the identifier which corresponds to the first input event; and,
means for transmitting the first input event to the first application according to the indicia.

19. The system as recited in claim 12 which further comprises:
means for transmitting a second set of input events for a second input device to the recognition subsystem in the memory;
means for assigning a corresponding identifier to each of the input events in the second set with the recognition subsystem; and,
means for storing the second set of input events and the corresponding identifiers at the recognition subsystem and at a second recognition provider coupled to the second input device.

20. The system as recited in claim 19 which further comprises:
means for transmitting a first input signal from the first input device and a second input signal from the second input device;
means for recognizing the first input signal as a first input event with the first recognition provider and the second input signal as a second input event with the second recognition provider; and,
means for transmitting the corresponding identifiers of the first and second input events to the recognition subsystem.

21. The system as recited in claim 20 which further comprises:
means for comparing the corresponding identifiers of the first and second input events to the identifiers corresponding to the first and second sets of input events respectively; and,
means for transmitting the first and second input events to a first application in memory from the recognition subsystem.

22. The system as recited in claim 20 which further comprises:
means for comparing the corresponding identifiers of the first and second input events to the identifiers corresponding to the first and second sets of input events respectively; and,
means for transmitting the first input event to a first application in memory and the second input event to a second application in memory from the recognition subsystem.

23. A computer program product for registering a first input device executable on a computer system, the system having a memory, a processor and a display coupled to a system bus, the product comprising:
program code means for allocating a first or normal channel in the memory for a presentation manager and a second channel in the memory for a recognition subsystem, each channel being a separate and independent program path in the memory;
program code means for transmitting a first set of input events for the first input device to the recognition subsystem in the memory;

program code means for assigning a corresponding identifier to each of the input events with the recognition subsystem; and, program code means for storing the first set of input events and the corresponding identifiers at the recognition subsystem and at a first recognition provider to the recognition subsystem and coupled to the first input device;

program code means for transmitting a first input signal from the first input device to the first recognition provider, by passing the presentation manager;

program code means for recognizing the first input signal as a first input event with the first recognition provider; and, program code means for transmitting the corresponding identifier of the first input event from the first recognition provider to the recognition subsystem.

24. The product as recited in claim 23 which further comprises:

program code means for comparing the corresponding identifier of the first input event to the identifiers corresponding to the first set of input events; and, program code means for transmitting the first input event to a first application in memory from the recognition subsystem.

25. The product as recited in claim 24 which further comprises:

program code means for determining a system state when the first input signal was transmitted;

program code means for transmitting the first input event to the first application according to the system state.

26. The product as recited in claim 24 which further comprises:

program code means for determining a system state when the first input signal was transmitted; and, program code means for transmitting the system state to the first application with the first input event.

27. The system as recited in claim 23 which further comprises:

program code means for sending the first input event to a translation agent in memory which translates the first input event to a first message understood by a first process running in memory; and, program code means for transmitting the first message to the first application.

28. The product as recited in claim 23 which further comprises:

program code means for generating a false input signal corresponding to the first input signal;

program code means for transmitting the false input signal to an operating system for transmission to a first application and transmitting the first input signal to an extended information queue;

program code means for intercepting a false input signal before receipt by the first application; and, program code means for retrieving the first input signal from the extended information queue.

29. The product as recited in claim 23 which further comprises:

program code means for transmitting an indicia that the first input event is to be sent to a first application with the identifier which corresponds to the first input event; and, program code means for transmitting the first input event to the first application according to the indicia.

30. The product as recited in claim 23 which further comprises:

program code means for transmitting a second set of input events for a second input device to the recognition subsystem in the memory;

program code means for assigning a corresponding identifier to each of the input events in the second set with the recognition subsystem; and, program code means for storing the second set of input events and the corresponding identifiers at the recognition subsystem and at a second recognition provider coupled to the second input device.

31. The product as recited in claim 30 which further comprises:

program code means for transmitting a first input signal from the first input device and a second input signal from the second input device;

program code means for recognizing the first input signal as a first input event with the first recognition provider and the second input signal as a second input event with the second recognition provider; and, program code means for transmitting the corresponding identifiers of the first and second input events to the recognition subsystem.

32. The product as recited in claim 31 which further comprises:

program code means for comparing the corresponding identifiers of the first and second input events to the identifiers corresponding to the first and second sets of input events respectively; and, program code means for transmitting the first and second input events to a first application in memory from the recognition subsystem.

33. The product as recited in claim 31 which further comprises:

program code means for comparing the corresponding identifiers of the first and second input events to the identifiers corresponding to the first and second sets of input events respectively; and, program code means for transmitting the first input event to a first application in memory and the second input event to a second application in memory from the recognition subsystem.

* * * * *